US009136956B2

(12) United States Patent
Black

(10) Patent No.: US 9,136,956 B2
(45) Date of Patent: Sep. 15, 2015

(54) METHOD AND SYSTEM FOR PLANNING AND RUNNING VIDEO-ON-DEMAND ADVERTISING

(75) Inventor: Neville A. Black, Collegeville, PA (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 772 days.

(21) Appl. No.: 10/701,895

(22) Filed: Nov. 5, 2003

(65) Prior Publication Data

US 2005/0096978 A1 May 5, 2005

(51) Int. Cl.
*H04N 7/025* (2006.01)
*H04N 21/25* (2011.01)
*H04H 20/38* (2008.01)
*G06Q 30/02* (2012.01)
(Continued)

(52) U.S. Cl.
CPC ............... *H04H 20/38* (2013.01); *G06Q 30/02* (2013.01); *G06Q 30/0257* (2013.01); *H04H 20/103* (2013.01); *H04H 60/06* (2013.01); *H04H 60/40* (2013.01); *H04H 60/45* (2013.01); *H04H 60/52* (2013.01); *H04H 60/63* (2013.01); *H04N 7/17318* (2013.01); *H04N 21/25883* (2013.01); *H04N 21/2668* (2013.01); *H04N 21/42684* (2013.01); *H04N 21/47202* (2013.01); *H04N 21/812* (2013.01)

(58) Field of Classification Search
CPC .................... H04N 21/2668; H04N 21/25883
USPC ............... 725/105, 32, 34–35, 36, 42, 46, 43; 705/14.48–14.49, 15.5, 15.52, 14.67, 705/16.68, 14.69
See application file for complete search history.

(56) References Cited

U.S. PATENT DOCUMENTS 5,155,591 A * 10/1992 Wachob .......................... 725/35
5,424,770 A *  6/1995 Schmelzer et al. ............. 725/36
(Continued)

FOREIGN PATENT DOCUMENTS

WO          03/053056 A     6/2003
WO          03053056        6/2003

OTHER PUBLICATIONS

Supplementary European Search Report in related European patent application No. EP 04 79 5735, dated Oct. 21, 2009.
(Continued)

*Primary Examiner* — Pankaj Kumar
*Assistant Examiner* — Reuben M Brown
(74) *Attorney, Agent, or Firm* — Banner & Witcoff, Ltd.

(57) ABSTRACT

A method and system for planning and running video-on-demand (VOD) advertising includes a planner for planning advertising campaigns and an ad selector for running selected advertisements from selected ones of the campaigns. The campaigns are associated with household demographic classifications, video content category categories, household geographic locations, and/or video viewing times. In response to a viewer requesting a video, the selector selects the campaigns corresponding to the demographic classification associated with the viewer, the content category of the requested video, the geographic location associated with the viewer, and/or the viewing time at which the requested video is viewed. The demographic classification is determined by using an identifier of the viewer's set-top-box. The selector may select the campaigns corresponding to the content categories of the requested video. The content categories are determined by using an identifier associated with the requested video.

22 Claims, 2 Drawing Sheets

(51) Int. Cl.
*H04H 20/10* (2008.01)
*H04H 60/06* (2008.01)
*H04H 60/40* (2008.01)
*H04H 60/45* (2008.01)
*H04H 60/52* (2008.01)
*H04H 60/63* (2008.01)
*H04N 7/173* (2011.01)
*H04N 21/258* (2011.01)
*H04N 21/2668* (2011.01)
*H04N 21/426* (2011.01)
*H04N 21/472* (2011.01)
*H04N 21/81* (2011.01)

(56) References Cited

U.S. PATENT DOCUMENTS

| | | | | |
|---|---|---|---|---|
| 5,432,542 | A | * | 7/1995 | Thibadeau et al. ............ 725/35 |
| 5,515,098 | A | * | 5/1996 | Carles ............................ 725/35 |
| 5,600,366 | A | | 2/1997 | Schulman |
| 5,652,615 | A | * | 7/1997 | Bryant et al. .................. 725/35 |
| 5,661,516 | A | * | 8/1997 | Carles ............................ 725/35 |
| 5,694,162 | A | * | 12/1997 | Freeny, Jr. .................... 725/116 |
| 5,774,170 | A | | 6/1998 | Hite et al. |
| 6,002,393 | A | | 12/1999 | Hite et al. |
| 6,070,186 | A | | 5/2000 | Nishio |
| 6,160,989 | A | * | 12/2000 | Hendricks et al. .............. 725/36 |
| 6,285,987 | B1 | | 9/2001 | Roth et al. |
| 6,388,712 | B1 | * | 5/2002 | Shinohara et al. ............ 348/473 |
| 7,039,938 | B2 | * | 5/2006 | Candelore ........................ 725/87 |
| 2002/0083444 | A1 | * | 6/2002 | Blasko et al. ................... 725/35 |
| 2002/0124249 | A1 | * | 9/2002 | Shintani et al. ................. 725/32 |
| 2002/0124254 | A1 | * | 9/2002 | Kikinis ........................... 725/34 |
| 2002/0188545 | A1 | * | 12/2002 | Wiesehuegel et al. .......... 705/37 |
| 2003/0149975 | A1 | * | 8/2003 | Eldering et al. ................. 725/34 |
| 2003/0191816 | A1 | | 10/2003 | Landress et al. |
| 2003/0220866 | A1 | * | 11/2003 | Pisaris-Henderson et al. . 705/37 |
| 2003/0226142 | A1 | * | 12/2003 | Rand ............................... 725/32 |
| 2004/0003413 | A1 | * | 1/2004 | Boston et al. ................. 725/133 |
| 2005/0021395 | A1 | * | 1/2005 | Luu ................................ 705/14 |
| 2005/0021444 | A1 | * | 1/2005 | Bauer et al. ..................... 705/37 |
| 2006/0015449 | A1 | * | 1/2006 | Underwood et al. ............ 705/37 |
| 2006/0161947 | A1 | * | 7/2006 | Laksono et al. ................. 725/34 |
| 2006/0190964 | A1 | * | 8/2006 | Eldering ......................... 725/42 |
| 2007/0168557 | A1 | * | 7/2007 | Henry ........................... 709/246 |
| 2007/0220596 | A1 | * | 9/2007 | Keeler et al. ...................... 726/7 |
| 2009/0210901 | A1 | * | 8/2009 | Hawkins et al. ................. 725/34 |
| 2012/0323705 | A1 | * | 12/2012 | Calder et al. .............. 705/14.73 |
| 2014/0013354 | A1 | * | 1/2014 | Johnson et al. ................. 725/35 |

OTHER PUBLICATIONS

Office action EP 04795735.2, dated Apr. 10, 2012.

* cited by examiner

METHOD AND SYSTEM FOR PLANNING AND RUNNING VIDEO-ON-DEMAND ADVERTISING

BACKGROUND OF THE INVENTION

1. Field of the Invention

The present invention relates to a method and system for planning and running video-on-demand (VOD) advertising.

2. Background Art

Video distribution systems may be configured to enable a service provider to distribute videos for viewing by viewers in response to requests for the videos by the viewers. Such a video distribution service is known as video-on-demand (VOD). In VOD, video distribution systems include a communications network which enables communications between a service provider and viewers. The provider is typically a cable service provider and the network is typically a cable communications network. A viewer communicates a request for a video over the network to the provider. In response to the request, the provider communicates the requested video over the network to the viewer.

Viewers view requested videos on display devices such as televisions. Each television has a communications network transceiver device such as a set-top-box (STB). The STBs connect the respective televisions to the network on the viewer side of the network.

The provider has video servers which connect to the network on the provider side of the network. The video servers have access to stored videos which the provider may offer to the viewers for viewing. In response to a request from a viewer to view a video, a video server provides the requested video to the network for distribution to the STB of the television of the viewer requesting the video. The viewer then views the requested video on the viewer's television.

SUMMARY OF THE INVENTION

An object of the present invention is to provide a method and system for planning and running video-on-demand (VOD) advertising.

Another object of the present invention is to provide a method and system for running VOD advertising in which selected advertisements accompany the requested video. The advertisements are selected as a function of at least one of the content category of the requested video, a demographic classification corresponding to the neighborhood of the residence from which the viewer requested the video, the geographic location of the residence from which the viewer requested the video, and the time at which the viewer requested the video.

A further object of the present invention is to provide a method and system for planning VOD advertising in which an advertiser's campaign of advertisements is selectively associated with at least one of the content categories of videos available for viewer request, demographic classifications corresponding to the neighborhoods of the residences from which viewers request videos, the geographic locations of the residences from which viewers request videos, and the times at which viewers request videos.

In carrying out the above objects and other objects, the present invention provides a method for planning VOD advertising to accompany videos when the videos are delivered by a service provider to viewers in response to requests for the videos by the viewers. Each video has at least one content category. Each viewer is located at a respective residence. Each respective residence is in a neighborhood and has a geographic location. Each neighborhood has a corresponding demographic classification.

The method includes defining advertising campaigns each having at least one advertisement. The method further includes associating each advertising campaign with at least one content category, at least one geographic location served by the service provider, at least one demographic classification, and at least one interval of time.

The method may include identifying the advertising campaigns which are associated with at least one content category matching the content categories of a video, a demographic classification matching the demographic classification corresponding to the neighborhood of the residence at which a viewer is located, a geographic location matching the geographic location of the residence at which a viewer is located, and an interval of time matching the time at which a viewer requests the video. At least one advertisement of at least one of the identified advertising campaigns may then be identified as being eligible for accompanying the video. The matching may be done using rule based associations which are either determinative or predictive.

Further, in carrying out the above objects and other objects, the present invention provides a VOD system and an associated method. The VOD system includes a display device having a set-top-box (STB). The STB has an identifier and is located at a residence in a neighborhood. A server is connected to the STB. The server transmits a video to the STB upon receiving a request for the video from a viewer of the display device.

A selector is operable for using an identifier indicative of the video to determine content categories of the video. The selector is operable for using the STB identifier to determine both a demographic classification corresponding to the neighborhood of the residence and a geographic location of the residence. The selector selects advertisements from a group of advertisements as a function of at least one of the content categories of the requested video, the demographic classification of the residence, the geographic location of the residence, and the time at which the request for the video is made. The server transmits the selected advertisements with the video to the STB for the viewer to view on the display device.

The advantages accruing to the present invention are numerous. For instance, the present invention matches content and target audience. The present invention solves the problem of advertising effort being wasted on uninterested viewers in a general VOD viewer audience by providing selected advertisements to VOD viewers.

Advertisers will benefit from the present invention as small advertisers that do not have the budget to advertise to a general audience are now able to literally buy a part of the audience for a popular show, and to be the sponsor for the show for that part of the audience, so that all the advertisements shown to that part of the audience are from the one advertiser.

DETAILED DESCRIPTION OF THE PREFERRED EMBODIMENT(S)

Figure 1:
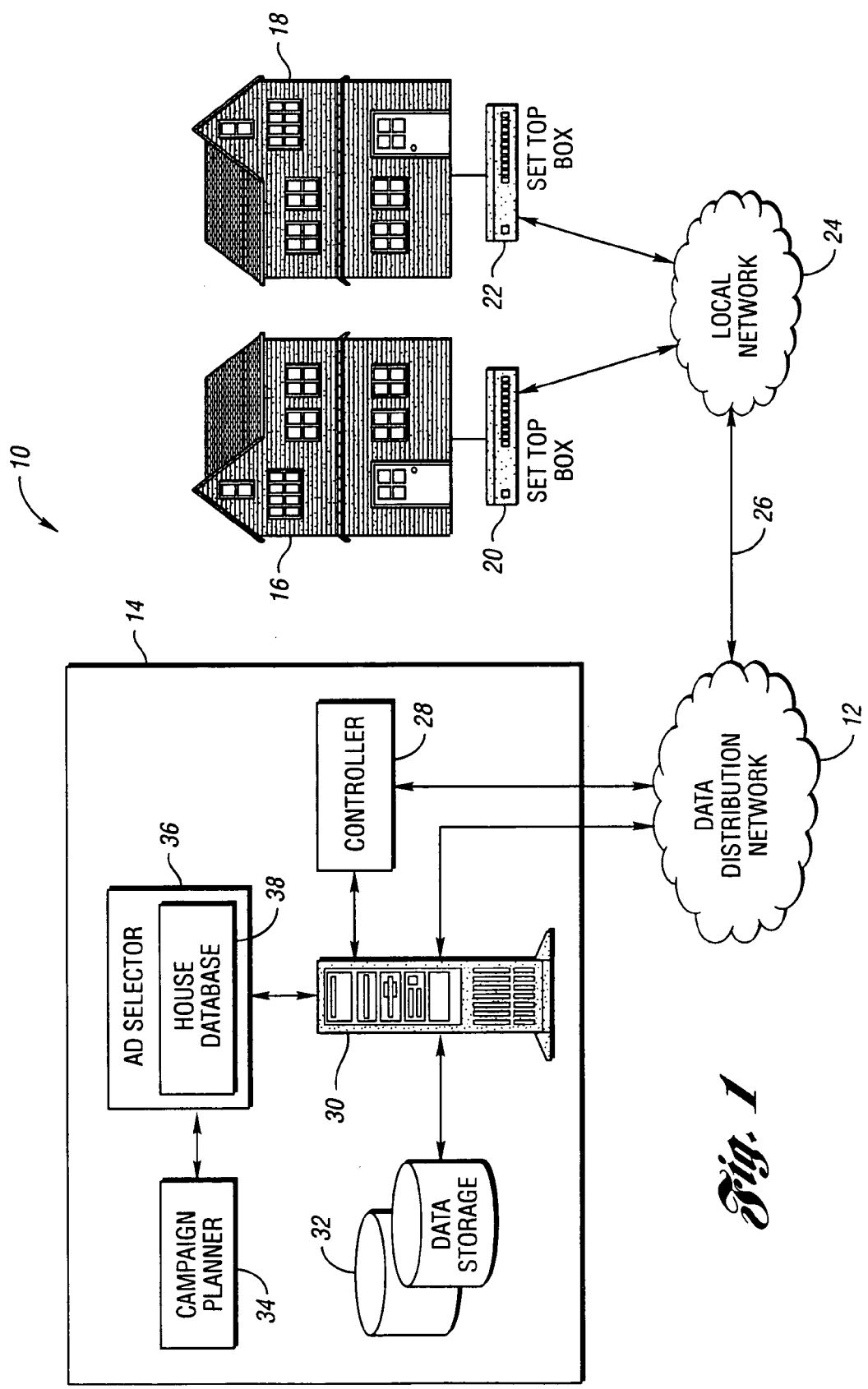
FIG. 1 illustrates a block diagram of a video-on-demand (VOD) system in accordance with the present invention.

Referring now to FIG. 1, a block diagram of a video-on-demand (VOD) system 10 in accordance with the present invention is shown. VOD system 10 includes a data communications network 12. Network 12 connects a cable service provider 14 to viewers such as viewers 16 and 18. Network 12 enables two-way communication between provider 14 and viewers 16 and 18 in households to enable the provider to provide videos for viewing by the viewers in response to viewer requests. For instance, viewer 16 communicates a request for a video over network 12 to provider 14. In response to this request, provider 14 communicates the requested video via network 12 to viewer 16. Network 12 also distributes television signals in an analog radio-frequency format to viewers 16.

Viewers 16 and 18 have their own display devices such as televisions for receiving and viewing requested videos provided by provider 14. As such, viewers 16 and 18 view requested videos distributed by provider 14 on the display devices, i.e., televisions. Each television has a respective communications network transceiver device such as a set-top-box (STB) 20 and 22. STBs 20 and 22 connect the televisions of viewers 16 and 18 to network 12.

Viewers 16 and 18 may be located in a local geographic area such as a neighborhood. In this event, a local data communications network 24 connects network 12 and viewers 16 and 18. Networks 12 and 24 may have a hybrid fiber coax (HFC) architecture. As such, network 12 includes optical fiber for internal communications and an optical fiber 26 connects networks 12 and 24. Cable connections 28 connect local network 24 to STBs 20 and 22 of viewers 16 and 18.

Provider 14 has a controller 28 and a video server 30. Controller 28 connects to network 12 to enable provider 14 to communicate with viewers 16 and 18 and to control the video programming provided by the provider. Video server 30 has access to data storage 32 for storing videos and advertisements. Provider 14 communicates with viewers 16 and 18 to offer the videos for viewing by the viewers. Video server 30 connects to network 12 to transmit a video requested by a viewer such as viewer 16 to STB 20 of the viewer's television. Viewer 16 then views the requested video on the viewer's television. As a result, VOD system 10 is configured to enable viewer 16 to view "videos-on-demand" ("VOD") from provider 14.

In accordance with the present invention, provider 14 includes a campaign planner subsystem 34 and an advertisement (ad) selector subsystem 36 which together form a system for planning and running VOD advertising. Campaign planner 34 enables provider 14 to set-up advertising campaigns for different advertisers. Each advertising campaign has one or more advertisements (i.e., ads). The ads in the advertising campaigns are available for distribution to viewers 16 and 18 in accordance with defined rules. Video server 30 is operable to distribute the ads of the advertising campaigns which satisfy the rules to viewers 16 and 18 along with requested videos.

Campaign planner 34 enables the rules for the advertising campaigns and the ads to be defined. The rules restrict which advertising campaigns and which ads in those advertising campaigns are to be presented to viewers 16 and 18 during the viewing of requested videos. The rules identify the ads which are eligible for distribution to a VOD viewer audience and, accordingly, enable targeted ads to be presented to the VOD viewer audience. To this end, the rules restrict the availability of the ads of advertising campaigns to a viewer's television as a function of at least one of the content category that a requested video satisfies, a demographic classification corresponding to the neighborhood of the residence in which the STB of the viewer's television is located, the geographic location of the residence in which the STB is located, and the time at which the requested video runs on the viewer's television.

Ad selector 36 applies the rules to identify the advertising campaigns and which ads in those advertising campaigns are to be presented to viewer 16 during the viewing of a requested video by the viewer. In order to apply the rules for the particular viewing of the requested video by viewer 16, ad selector 36 determines the identity and content of the requested video, the geographic location of the residence in which STB 20 of the television of viewer 16 is located, the demographic classification corresponding to the neighborhood of the residence in which the STB is located, and the time at which the requested video is to run on the television for the viewer.

In order to determine the identity and the content of the requested video, ad selector 36 obtains the asset identifier of the requested video when viewer 16 requests the video. Using the asset identifier, ad selector 36 identifies the requested video and the content category or categories that the requested video satisfies. Each eligible video has content which falls into at least one content category. Content categories may include, for example, audience categories such as kids, teens, general-male, general-female; genre categories such as sports, news, soaps, cartoons, drama, biography; and particular content providers such as HBO™, ESPN™, Discovery™. As an example, a requested video of a football game would fall into the sports category and perhaps the general-male category as well.

Ad selector 36 uses an identifier of STB 20 of the television of viewer 16 to determine the geographic location of the residence in which the STB is located. STB 20 identifier, such as a "unit address" associated with the STB or a serial number of the STB, enables ad selector 36 to determine geographic location information such as the street address, the ZIP area code, and the ZIP+4 area code of the residence (i.e., household, business site, public/private facility, etc.) in which STB 20 and, consequently, viewer 16 are located. To this end, ad selector 36 has a house database 38 which stores a list of the identifiers of the STBs serviced by provider 14 and stores a corresponding list of ZIP and ZIP+4 area codes associated with the residences in which the STBs are located.

Based on the geographic location of the residence (i.e., household) in which STB 20 is located, such as the ZIP+4 area code of the household in which the STB is located, a demographic classification corresponding to the household in which the STB is located may be determined. The demographic classifications are provided by a marketing provider and may be stored in a list in house database 38. The demographic classification corresponding to the household in which STB 20 is located is indicative of demographic characteristics of the neighborhood in which the household is located. As viewer 16 is likely to belong to the household in which STB 20 is located, the determined demographic classification of the household in which STB 20 is located is likely to be indicative of demographic characteristics of the viewer. It is noted that, instead of ZIP+4 area codes being used to obtain the corresponding demographic classification, similar types of information such as "census block" data may be used to obtain the corresponding demographic classification.

Using the demographic classification corresponding to the household in which STB 20 is located, the geographic location of the household in which the STB is located, the content category or categories of the video requested by viewer 16, and the time that the requested video is run on the viewer's television, ad selector 36 applies the rules defined in campaign planner 34 to determine which advertiser's campaigns and which ads in those campaigns are to be eligible for that viewing of the requested video by the viewer. Ad selector 36 then selects certain ones of the eligible ads for presentation to viewer 16 during the viewing of the requested video. Video server 30 inserts the selected ads at appropriate insertion points in the requested video. Viewer 16 then views the selected ads and the requested video on the viewer's television.

Figure 2:
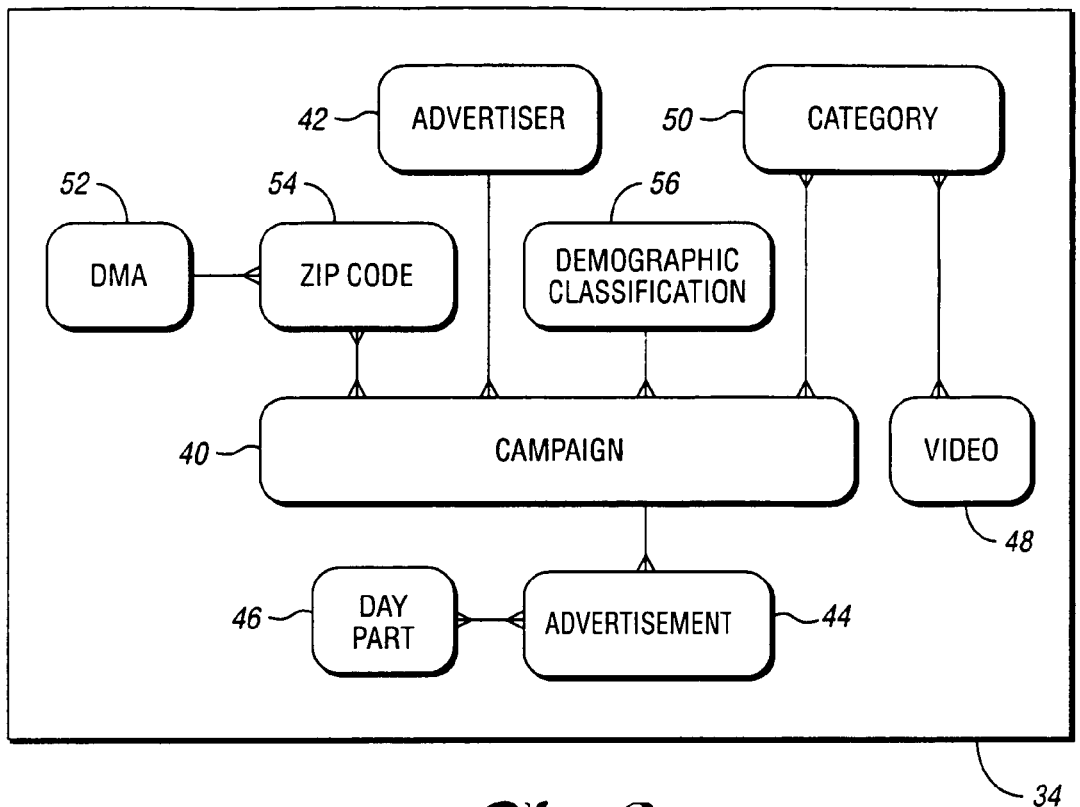
FIG. 2 illustrates a block diagram of the logical structure of the database of the campaign planner subsystem of the VOD system shown in FIG. 1.

Referring now to FIG. 2, with continual reference to FIG. 1, a block diagram illustrating the logical structure of campaign planner 34 is shown. Campaign planner 34 is based on a database having the illustrated logical structure. The logical structure includes at least one advertising campaign 40. Each advertising campaign 40 belongs to an advertiser 42. (For simplicity, it is assumed that there is only one advertiser 42. It is noted that advertiser 42 may have many advertising campaigns and there may be many advertisers having many advertising campaigns.)

Advertising campaign 40 has one or more ads 44. As such, each ad 44 belongs to an advertiser 42 and is in an advertising campaign 40 of that advertiser. Advertiser 42 pays for its ads 44 based on the number of times its ads are viewed by viewers 16 and 18 during the presentation of requested videos to the viewers. Each ad 44 has a cost that is charged to a budget of advertising campaign 40. The ad cost is the product of the time duration of ad 44 and the per-unit time cost associated with advertising campaign 40. In addition to the campaign budget, advertising campaign 40 has start and end dates during which the ads of the advertising campaign may run.

Each ad 44 in advertising campaign 40 has an associated run frequency. The run frequency expresses the relative frequency with which the ads in advertising campaign 40 may run for viewers 16 and 18. Further, each ad 44 in advertising campaign 40 has an associated set of day parts 46 which constrains the time of day that the ads may run for viewers 16 and 18.

As indicated above, each available video 48 has content that satisfies at least one content category 50. Advertising campaign 40 is associated with at least one content category 50. Videos 48 having content that satisfies the content categories 50 associated with advertising campaign 40 are eligible for being presented with ads 44 of the advertising campaign. The rules may be defined such that the content of a video must fall into at least one of, a subset or group of, or all of the content categories 50 associated with advertising campaign 40 in order to be eligible for being presented with ads 44 of the advertising campaign.

Each video 48 is associated with a specified number of ad avails (i.e., a specified number of ads which may run with the video). When viewer 16 decides to watch a requested video 48, ad selector 36 selects ads 44 to be played for that viewing of that video based on the defined rules with the number of ads being selected such that the number of ad avails are filled.

Campaign planner 34 enables advertising campaigns 40 to be defined in terms of geography, demographics, and the content in which ads 44 will appear. Advertising campaigns 40 are defined using information which can be described as "who they are—what they watch" and may be defined based on: 1) geographic and demographic information corresponding to the households of the viewers; and 2) the type of content of the requested video. Advertising campaigns 40 may also be defined such that some or all of ads 44 of the advertising campaigns are restricted to play during certain day times. The goal in associating rules with advertising campaigns 40 is to enable targeted ads 44 to be provided to viewers 16 and 18 while VOD services are being provided to the viewers.

With respect to geographic selection, campaign planner 34 allows advertising campaigns 40 to be defined as to reach households within an entire designated market area (DMA) 52, households having selected ZIP codes in the DMA, households in a set of DMAs, etc.

With respect to demographic selection, campaign planner 34 allows advertising campaigns 40 to be defined as to reach households having selected demographic classifications. Demographic classification codes 56 are a list of codes which classify viewer neighborhoods into classifications based on demographic and consumer information. These codes are made available by marketers to identify audiences. For instance, the PRIZM® lifestyle segmentation system of ©Claritas Inc. classifies people in certain economic and demographic categories. The PRIZM® system classifies neighborhoods into categories or clusters based on census data, consumer surveys, and other public and private sources of demographic and consumer information. The clusters or codes of the PRIZM® system are defined down to the ZIP+4 level which corresponds to 6-12 households. As such, demographic or neighborhood classification codes 56 may be defined using the PRIZM® system and/or other sources of viewer classification information.

Campaign planner 34 allows advertising campaigns 40 to be associated with selected video content categories 50. Videos 48 having content that is defined to be "in" those content categories 50 are then eligible for ads 44 of advertising campaigns 40. A particular video 48 may be "in" many content categories 50. A user uses campaign planner 34 to catalog a particular video 48 by placing the video into the content categories 50 that the content of the video satisfies.

Content categories 50 are not fixed and may be added at will. Campaign planner 34 includes a user interface that facilitates browsing by a user to list the video content that satisfies a set of content categories 50. New videos 48 that are cataloged after advertising campaign 40 is defined may be matched up with the advertising campaign.

The special case of sponsored content is accommodated by defining a specific content category, putting the sponsored videos in that category, and only running ads 44 from the advertising campaigns 40 that match the specified content category.

An advertiser may be the fractional sponsor of a particular video or series of videos. The effect is that whenever the sponsored video is viewed, an advertising campaign 40 of the advertiser has a percentage chance of its ads 44 being run with the sponsored video. For example, if 100 viewers request a sponsored video then probabilistically twenty of them will receive the ads 44 from the advertising campaigns 40 of the advertiser who is sponsoring 20% of the video.

Figure 3:
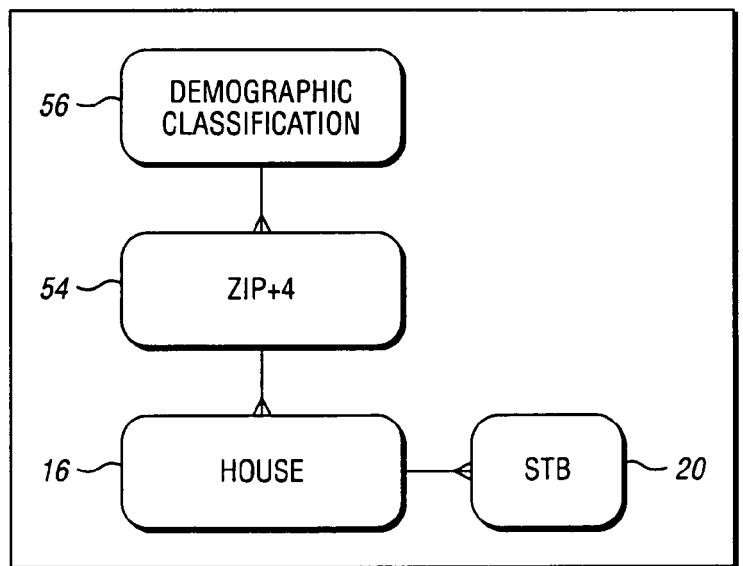
FIG. 3 illustrates a block diagram of the logical structure of the house database of the advertisement (ad) selector subsystem of the VOD system shown in FIG. 1.

Referring now to FIG. 3, with continual reference to FIGS. 1 and 2, a block diagram illustrating the logical structure of house database 38 of ad selector 36 is shown. As described above, when viewer 16 selects a particular video 48 for viewing, video server 30 passes the identifier of the viewer's STB 20 and the asset identifier of the video to ad selector 36. Ad selector 36 applies this gathered information against the rules associated with advertising campaigns 40 in order to determine which advertising campaigns and which ads in those advertising campaigns are to be presented during the viewing of the requested video 48 by viewer 16. Ad selector 36 then passes identifiers of the selected ads and time insertion points to video server 30. Video server 30 then inserts the selected ads into the insertion points in the requested video 48 for viewer 16 to view.

Ad selector 36 uses house database 38 to determine the ZIP+4 code 54 of the household in which STB 20 of viewer 16 is located based on the STB identifier. Ad selector 36 then uses house database 38 to determine a demographic classification code 56 of the household in which STB 20 is located based on the ZIP+4 code 54 of the household. The determined ZIP+4 code 54 and the determined demographic classification code 56 correspond to the household in which STB 20 is located and, consequently, likely correspond to viewer 16 of the television connected to the STB.

The logic of ad selector 36 is as follows. First, determine all feasible advertising campaigns 40; second, apply factors to select one of the feasible advertising campaigns; and third, select ads 44 from the selected advertising campaign. This logic means that all ads 44 for one viewing are from one advertising campaign 40. This is only assumed here to simplify discussion.

Ad selector 36 determines an advertising campaign 40 to be feasible if it meets the following conditions. One, the advertising campaign 40 has not exhausted its budget. Two, the requested video 48 has content which is in at least one content category 50 associated with the advertising campaign 40. Three, the advertising campaign 40 is associated with a demographic classification corresponding to the neighborhood of the residence in which the STB 20 making the viewing request is located. Four, the advertising campaign 40 is associated with a ZIP code corresponding to the residence in which the STB making the viewing request is located. Five, the advertising campaign 40 has enough ads 44 to fill all of the ad avails for the requested video 48 while meeting any constraints of day parts 46.

If there are no feasible advertising campaigns 40, then either viewer 16 views the requested video 48 without ads 44 or views the requested video with public service ads and the like. If there are multiple feasible advertising campaigns 40 from multiple advertisers 42, then a relative priority may be assigned between the advertisers to provide ads 44 from the multiple advertisers. If there is a scarcity of feasible advertising campaigns 40 such that the budget of the feasible advertising campaigns would be exhausted rapidly, then mechanisms may be implemented to control the spending rate.

With respect to ad frequency within an advertising campaign 40, suppose there are three ads (A, B, and C) in the advertising campaign with relative frequencies of 30, 50, and 67. Ad selector 36 then generates a random number between 1 and 147. Ad selector 36 selects "A" if the number is between 1 and 30; selects "B" if the number is between 31 and 80; and selects "C" if the number is between 81 and 147.

For billing and reporting purposes, video server 30 captures a record of each ad event. The ad event record includes identification of the ad provided to the viewer, identification of the requested video, the running time duration of the ad, the date and time of viewing, and ZIP and ZIP+4 codes of the household. The records are exported to a reporting and billing application.

In summary, the method and system for planning and running VOD advertising in accordance with the present invention affords advertisers a combination of capabilities of known advertising forms with novel capabilities. These capabilities include matching video content with a viewer audience. An advertiser can select a mix of content designed to appeal to a particular viewer audience. Advertisers can buy a piece of an ad hit. As such, an advertiser with a small budget can buy part of a popular video by buying a percentage of the viewer audience. The ads may be flexible as a VOD is not constrained to rigid time slots as in broadcast advertising. An advertiser may buy all of the spots in some viewing of a particular video, thus enabling ads in different spots to be related to each other and combined for effect. A particular demographic may be reached as the present invention combines the selection by content/day part of broadcast television with the precise geographic/demographic classification delivery of direct mail. Advertisers know exactly what is happening with their ads as precise counts of every ad play may be provided.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method comprising:
   receiving a video on demand (VOD) request for a VOD program from a user device;
   identifying a plurality of fractional sponsors for the VOD program, each fractional sponsor being associated with a fractional sponsorship of the VOD program, the fractional sponsorship corresponding to a predetermined numeric percentage of an audience for the VOD program;
   selecting one fractional sponsor of the plurality of fractional sponsors according to its corresponding fractional sponsorship;
   selecting at least one advertisement from the selected one fractional sponsor based at least on demographic information regarding a user of the user device based on the VOD request;
   inserting the at least one advertisement from the selected one fractional sponsor within the VOD program at a location upstream from the user device; and
   transmitting the VOD program having the at least one inserted advertisement to the user device over a distribution network, such that all advertisements within the VOD program transmitted to the user device are from the selected one fractional sponsor.

2. The method of claim 1, wherein the user device is a first user device and the selected one fractional sponsor is a first fractional sponsor, the method further comprising:
   receiving a video on demand (VOD) request for the VOD program from a second user device;
   selecting a second fractional sponsor from the plurality of fractional sponsors according to its corresponding fractional sponsorship;
   selecting at least one advertisement from the second fractional sponsor;
   inserting the at least one selected advertisement from the second fractional sponsor within the VOD program at a location upstream from the second user device; and
   transmitting the VOD program having the at least one inserted advertisement from the second fractional sponsor to the second user device over the distribution network, such that all advertisements within the VOD program transmitted to the second user device are from the second fractional sponsor.

3. The method of claim 2, wherein selecting the at least one advertisement from the second fractional sponsor is based, at least in part, on demographic information regarding a user of the second user device and a content category assigned to the VOD program.

4. The method of claim 1, wherein the selecting of the at least one advertisement comprises: accessing a demographic classification code associated with the user device.

5. The method of claim 1, wherein the selecting the at least one advertisement further comprises comparing a cost of the at least one advertisement with a predetermined budget and dynamically controlling the selecting of the at least one advertisement to control a spending rate of the predetermined budget.

6. The method of claim 5, further comprising declining to select an advertisement for inclusion with the VOD program if the predetermined budget has been exhausted.

7. The method of claim 5, wherein the cost of the at least one advertisement is based on a per-unit time cost associated with an advertising campaign of the selected one fractional sponsor.

8. The method of claim 1, wherein selecting the at least one advertisement is further performed according to a time-of-day criterion.

9. The method of claim 1, wherein selecting the one fractional sponsor is further performed according to predetermined priorities assigned to the plurality of fractional sponsors of the VOD program.

10. The method of claim 1, wherein identifying the plurality of fractional sponsors for the VOD program occurs before receiving the VOD request for the VOD program.

11. The method of claim 1, wherein selecting the at least one advertisement from the selected fractional sponsor is based, at least in part, a content category assigned to the VOD program.

12. A system comprising:
a non-transitory memory; and
a processor configured to perform the following:
identifying a plurality of fractional sponsors of a video program, each fractional sponsor associated with a fractional sponsorship of the video program, the fractional sponsorship corresponding to a predetermined numeric percentage of an audience for the video program;
selecting a single fractional sponsor from the plurality of fractional sponsors for a transmission of the video program to a first user device among a plurality of user devices, the selecting based, at least in part, on the associated fractional sponsorship of the single fractional sponsor; and
selecting advertisements from the single fractional sponsor of the identified plurality of fractional sponsors for inclusion with the transmission of the video program to the first user device, the selecting advertisements based at least in part on user demographic data, such that all advertisements of the video program transmitted to the first user device are from the single fractional sponsor.

13. The system of claim 12, wherein the video program is a video on demand program, and the processor is further configured to access a demographic database using information received with a request for the video on demand program from the user device.

14. The system of claim 12, wherein the processor is further configured to compare a cost of one advertisement of the selected advertisements for the single fractional sponsor with a predetermined budget, and dynamically control the selection of the one advertisement to control a spending rate of the predetermined budget.

15. The system of claim 14, wherein the processor is further configured to decline to select the one advertisement for inclusion with the video program if the predetermined budget has been exhausted.

16. The system of claim 14, wherein the cost of the one advertisement is based on a per-unit time cost associated with an advertising campaign of the single fractional sponsor.

17. The system of claim 12, wherein the processor is further configured to select one advertisement of the selected advertisements according to a time-of-day criterion.

18. The system of claim 12, wherein the processor is further configured to select the single fractional sponsor among the plurality of fractional sponsors according to predetermined priorities assigned to the plurality of fractional sponsors of the video program.

19. The system of claim 12, wherein the system is configured to identify the plurality of fractional sponsors for the video program prior to receiving a request for the video program.

20. The system of claim 12, wherein the selecting the advertisements from the single fractional sponsor is based, at least in part, on a content category assigned to the video program.

21. A method, comprising:
storing, by a computing device, a list identifying predetermined numeric audience percentages for a plurality of fractional sponsors of a program;
for each of a plurality of transmissions of the program, selecting one of the fractional sponsors based on the audience percentages of the plurality of fractional sponsors;
for each of the plurality of transmissions, selecting at least one advertisement from the corresponding selected one of the fractional sponsors based, at least in part, on demographic information regarding a user of a user device intended to receive the one transmission; and
performing the plurality of transmissions of the program, wherein all advertisements within each of the transmissions are from a corresponding selected one of the fractional sponsors.

22. The method of claim 21, wherein selecting the at least one advertisement from the corresponding selected one of the fractional sponsors is based, at least in part, on content category assigned to content within the one transmission.

* * * * *

UNITED STATES PATENT AND TRADEMARK OFFICE
CERTIFICATE OF CORRECTION

PATENT NO. : 9,136,956 B2
APPLICATION NO. : 10/701895
DATED : September 15, 2015
INVENTOR(S) : Neville A. Black Page 1 of 1

It is certified that error appears in the above-identified patent and that said Letters Patent is hereby corrected as shown below:

In the Claims
Column 10, Claim 22, Line 51:
In Claim 22, after "on", please insert --a--

Signed and Sealed this
Ninth Day of August, 2016

Michelle K. Lee
*Director of the United States Patent and Trademark Office*